No. 11,848. Reissued Aug. 21, 1900.

R. J. FISHER.

TYPE WRITING MACHINE.

(Application filed Mar. 8, 1899.)

2 Sheets—Sheet 1.

Witnesses

Jas. K. McCathran

C. S. Hoff

Robert J. Fisher, Inventor

By his Attorneys,

C. A. Snow & Co.

THE ECKERT LITHOGRAPHING CO., WASHINGTON, D. C.

No. 11,848. Reissued Aug. 21, 1900.

R. J. FISHER.

TYPE WRITING MACHINE.

(Application filed Mar. 8, 1899.)

2 Sheets—Sheet 2.

Witnesses

Jas. H. McCathran

C. E. Hoyt

Robert J. Fisher, Inventor

By his Attorneys,

C. A. Snow & Co.

THE EOKERT LITHOGRAPHING CO., WASHINGTON, D. C.

UNITED STATES PATENT OFFICE.

ROBERT JOSEPH FISHER, OF ATHENS, TENNESSEE, ASSIGNOR TO THE FISHER TYPEWRITER COMPANY, OF TENNESSEE.

TYPE-WRITING MACHINE.

SPECIFICATION forming part of Reissued Letters Patent No. 11,848, dated August 21, 1900.

Original No. 578,554, dated March 9, 1897. Application for reissue filed March 8, 1899. Serial No. 708,288.

*To all whom it may concern:*

Be it known that I, ROBERT JOSEPH FISHER, a citizen of the United States, residing at Athens, in the county of McMinn and State of Tennessee, have invented a new and useful Type-Writing Machine, of which the following is a specification.

My invention relates to type-writing machines, and particularly to printing mechanism used in connection therewith, the particular class of printing mechanism to which my improvement appertains being that in which a plurality of type-faces are carried by a single type-head to provide for printing an upper and a lower case character by shifting the type-head.

One object in view is to simplify and improve the means for shifting a type head or carrier to bring either of its type-faces into printing position and accomplish the shifting movement with the minimum number of operating parts.

Further objects and advantages of this invention will appear in the following description, and the novel features thereof will be particularly pointed out in the appended claims.

Figure 1:
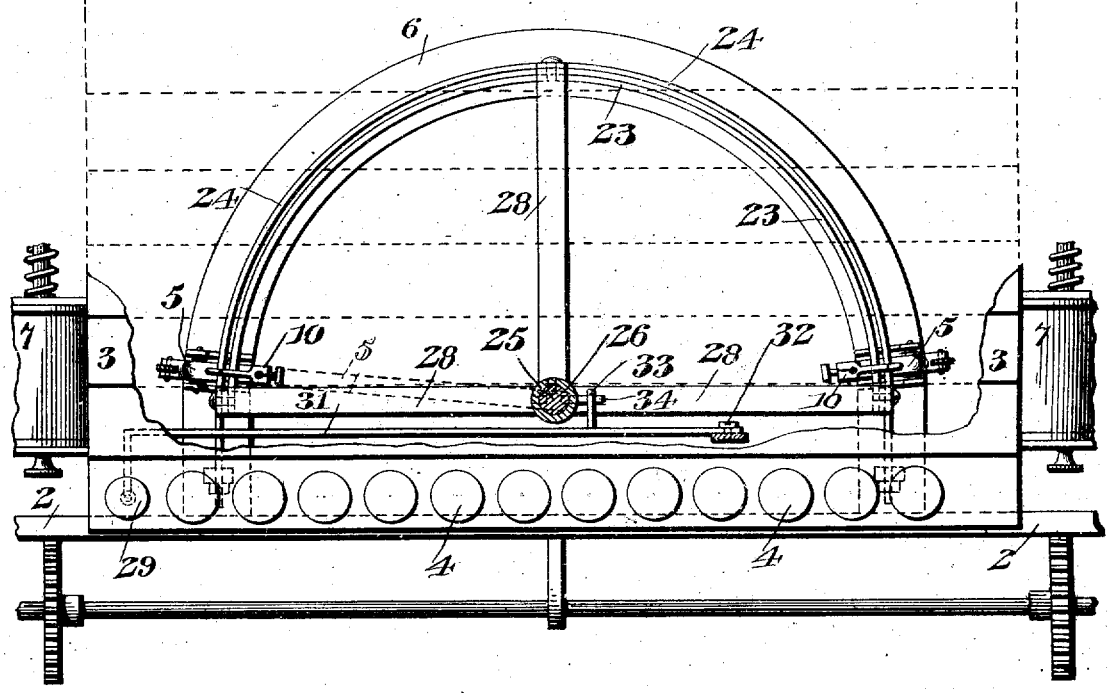
Figure 4:
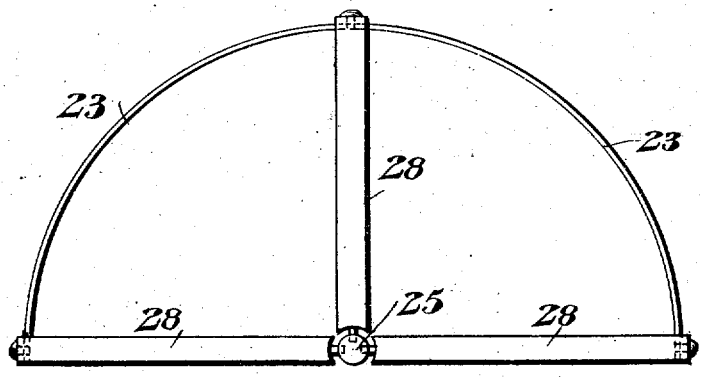
Figure 2:
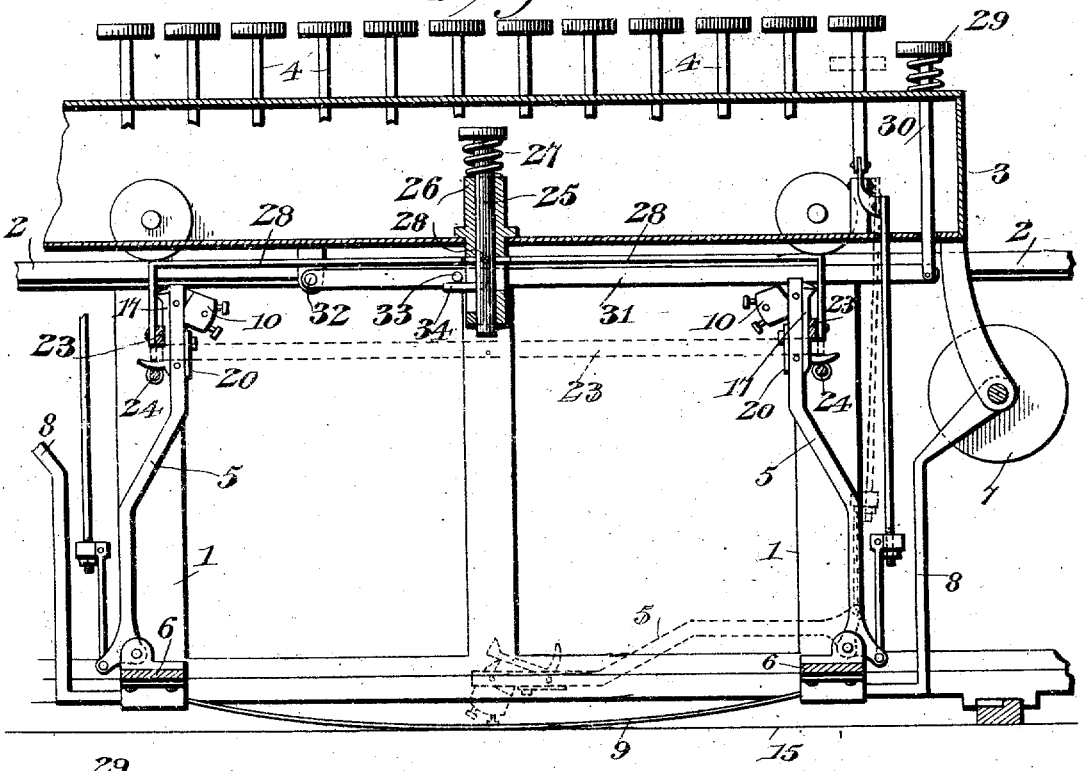
Figure 3:
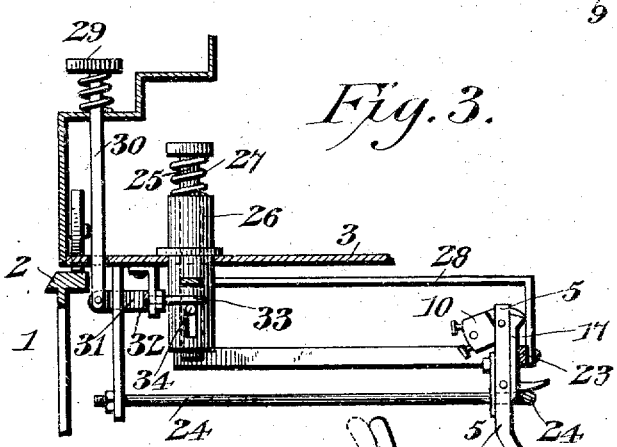
Figure 5:
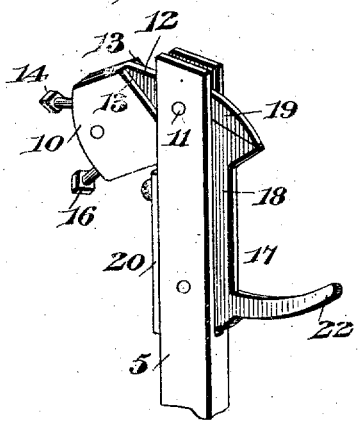
Figure 6:
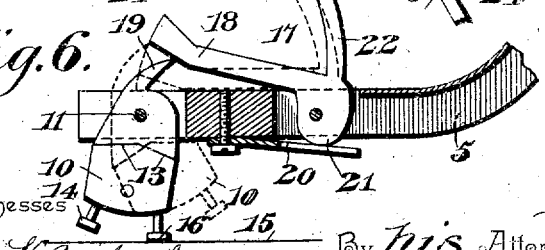

In the drawings, Figure 1 is a plan view of a portion of a type-writing machine, illustrating the relative positions of the type and case keys, type-bars, and means for shifting the movable type heads or carriers. Fig. 2 is a transverse vertical section of the same, showing in full lines the normal positions of the type-bars, type-heads, and trip and showing in dotted lines a type-bar in its depressed position with its type-head arranged with the upper-case-type face in the printing plane and also showing in dotted lines the depressed or operative position of the trip. Fig. 3 is a longitudinal vertical section of a portion of the machine to show the case-key and connections and the means for supporting and guiding the trip. Fig. 4 is a plan view of the trip and supporting spider or frame detached. Fig. 5 is a detail view in perspective of the free end of a type-bar to show the means for locking the type head or carrier in its normal position. Fig. 6 is a detail longitudinal section of the same.

Similar numerals of reference indicate corresponding parts in all the figures of the drawings.

1 designates the frame of a type-writing machine, of which 2 forms the front carriage-guide, 3 a carriage mounted for movement parallel with the lines of writing, 4 the type-keys, 5 the type-bars, 6 the type-bar-supporting ring, 7 the ribbon-spools, 8 the ribbon-guides, and 9 the ribbon, all constructed and arranged substantially as shown and described in my former patent No. 569,626, granted October 20, 1896, and forming no part of my present invention, inasmuch as the latter, as will hereinafter appear, is applicable to other forms of type-writing machines wherein each type-bar is constructed to carry a plurality of printing-faces.

The type-bar which I use in connection with my improved printing mechanism carries a movable type head or carrier 10, which is preferably pivoted, as at 11, in a terminal bifurcation of the type-bar, said type head or carrier being reduced and extended to form an ear 12, which fits between the cheeks of said bifurcation. The shoulders 13 at opposite sides of the ear 12 form stops to limit the movement of the type head or carrier in opposite directions, and inasmuch as the preponderance of weight or the center of gravity of the type head or carrier is in advance of the pivotal point 11 or at one side of the type-bar it will be seen that the said type head or carrier will be returned to such position by gravity as the type-bar returns after operation to its normal or upright position. (Illustrated in full lines in Figs. 2, 3, and 5.) Inasmuch as the lower-case characters are those which are used with greater frequency, I preferably place the lower-case-type face 14 uppermost upon the type head or carrier, whereby with the latter in its normal (or, as I will hereinafter term it, "retracted") position the lower-case-type face will produce the impression upon a printing-surface, such as that illustrated in Figs. 2 and 6 at 15, when the type-bar is actuated or moved to its printing position.

The movement of a type-bar to its depressed or printing position will cause the pivotal type head or carrier to be affected by centrifugal force, and I have found in practice that with the arrangement specified (the center of gravity of the type-head being arranged in advance of its pivotal point) the centrifugal force acting during the descent of a type-bar to its printing position will bring the other or upper-case type face 16 into printing position, as shown in full lines in Fig. 6, unless a positive lock is employed to maintain the type head or carrier in its lower-case position, as shown in dotted lines in said figure. Thus it will be seen that the movable type head or carrier is retracted or returned to its normal or lower-case position by gravity and is adapted to be "extended" centrifugally to produce the impression of an upper-case character.

The means which I have illustrated in the drawings for securing the type head or carrier in its lower-case position include a pivotal trigger 17, mounted upon the type-bar in the lower or inner end of a slot formed by the bifurcation therein and having the free extremity of its locking-arm 18 in operative relation with a finger 19, formed as an extension of the ear 12 and projecting beyond the rear or outer side of the type-bar. This locking-arm of the trigger is normally arranged in the path of the finger 19, as shown in Figs. 2, 3, and 5 and in dotted lines in Fig. 6; but when removed from the path of said finger the type head or carrier is free to be extended by centrifugal force, as above explained.

Various means may be adopted for reversing the position of this trigger and for maintaining it normally in the desired position; but I have found that an efficient arrangement is that illustrated in the drawings, wherein the trigger is firmly held in either position by means of a friction or brake spring 20, arranged in permanent contact with the rounded hub or friction-face 21 of the trigger. Inasmuch as this holding device, consisting of the brake-spring and friction-face, is constructed to maintain the trigger in either its operative or inoperative position, respectively, in or out of the path of the finger on the type head or carrier, it is obvious that such means must be provided for tripping the trigger as will provide for moving the same in either direction and which may when required be moved wholly out of operative relation with the trigger in order that a succession of impressions of either upper or lower case characters may be made without successive manipulations of the tripping devices. In the drawings these means are constructed to include a trip-arm 22 on the trigger, said trip-arm having opposite convexed and concaved operating-faces, and a trip 23, arranged for adjustment to bring it in the paths of the trip-arms, whereby the triggers may be disengaged from the fingers of the type heads or carriers. Inasmuch as the lower-case characters are more frequently used in ordinary work, I preferably arrange this trip normally out of the paths of the trip-arms, as shown in full line in Fig. 2, and I preferably support the trip yieldingly in its normal position to provide for movement in opposition to the force which holds it in its normal position when it is desired to release the type heads or carriers to print upper-case characters. In the drawings this trip is constructed of a continuous band or semiring and it is disposed contiguous to the upper or concave faces of the trip-arms, whereby when depressed against the force employed for yieldingly holding it in its normal position the trip is arranged in contact with the concaved faces of the trip-arms and is adapted to depress the latter during the forward-swinging movement of a type-bar in the act of moving the latter to its operative or printing position by means of a type-key.

If after the release of a type head or carrier and the operation of the type-bar supporting the same to cause the impression of an upper-case character the trip is returned to its normal position out of the paths of the trip-arms, the type head or carrier will, as above described, be returned to its lower-case position by gravity; but in order to return the locking device or trigger to its operative position I have found it expedient to employ a buffer 24, arranged in the paths of the trip-arms 22 for contact with the convex faces thereof. In the construction illustrated this buffer consists of a semiring of wire rod or its equivalent, which is permanently fixed to the carriage and is adapted to return each trigger to its normal or operative position after the actuation of a type-bar. This uniform operation of the buffer is entirely independent of the position of the trip, and hence the trigger of a given type-bar will be returned to its normal or operative position even if the trip is in its depressed or operative position.

In order to facilitate the operation of the trip, I employ a vertically-movable slide or stud 25, mounted in a guide-sleeve 26 and provided with a return-spring 27, by which the stud is yieldingly held in its elevated position. To this stud are attached the arms 28 of a spider carrying the trip 23, said spider forming a vertically-movable frame by which the trip is supported. The case-key 29 has its stem 30 connected to a case-key lever 31, which is fulcrumed terminally, as at 32, and is provided at an intermediate point with a lateral pin 33, engaging a similar pin 34 on the stud 25.

From the above description it will be seen that the trip, which forms the actuator for the locking devices by which the type heads or carriers are maintained in their normally-retracted or lower-case position, is arranged permanently out of the paths of the type-bars, inasmuch as the paths of the type-bars do not intersect that of the trip, and normally out of the paths of the trip-arms forming parts of said locking devices and is adapted to be adjusted to arrange it in the paths of said trip-arms to release the type heads or carriers whereby the upper-case type may be brough into printing position by centrifugal force due to the movement of the type-bars in approaching the printing plane. It will be seen also that the type heads or carriers after extension by centrifugal force are returned to their normal or retracted position by a constant yielding force, consisting in the construction illustrated of gravity, which is operative by reason of the preponderance of weight in each type head or carrier in advance of its pivotal point; but whereas the type heads or carriers are returned to their normal or lower-case positions by a constant yielding force, as gravity, the triggers by which the type heads or carriers are locked in their normal or lower-case position are actuated to bring them into operative position by a fixed buffer or "stationary" trip in contradistinction to the "movable" or adjustable trip, which is key-actuated and is adapted to be operated only when the reversal of a type head or carrier is desired to present a different type-face.

Various changes in the form, proportion, and the minor details of construction may be resorted to without departing from the spirit or sacrificing any of the advantages of the invention.

Having described my invention, what I claim is—

1. In a type-writing machine, the combination with a pivotal type-bar, of a type head or carrier movably supported thereon, the same being movable to its adjusted position by centrifugal force, when the type-bar is moved to the printing position, substantially as specified.

2. In a type-writing machine, the combination with a pivotal type-bar, of a type head or carrier movably supported thereon, means carried by the type-bar for holding the type head or carrier in its normal position, and manually-operated mechanism for actuating the said means by direct engagement therewith, to provide for the release of the type head or carrier.

3. In a type-writing machine, the combination with a pivotal type-bar, of a type head or carrier movably supported thereon, a locking device carried by the type-bar for holding the type head or carrier in its normal position, and manually-operated means adapted to directly engage with said locking device to release it from the type head or carrier, said means being permanently located outside of the path of the type-bars.

4. In a type-writing machine, the combination with a pivotal type-bar, of a type head or carrier movably supported thereon, a locking device carried by the type-bar for holding the type head or carrier in its normal position, and a key-actuated trip adapted to directly engage with the locking device to release it from the type head or carrier, the trip being permanently located outside of the path of the type-bar and shiftable to and away from a position for coöperating with the locking device.

5. In a type-writing machine, the combination with a pivotal type-bar, of a type head or carrier movably supported thereon, a locking device carried by the type-bar and normally arranged in engagement with the type head or carrier to maintain it in its normal position, and a key-actuated trip yieldingly held out of and adapted to be moved into the path of a trip-arm forming a part of said locking device, substantially as specified.

6. In a type-writing machine, the combination with a pivotal type-bar, of a type head or carrier movably supported thereon, a locking device carried by the type-bar for securing the type head or carrier in its normal position, and fixed and movable trips for coöperating with a trip-arm forming a part of said locking device, the fixed trip being permanently arranged in the path of the trip-arm, and the movable trip being capable of adjustment into and out of the path of the trip-arm, substantially as specified.

7. In a type-writing machine, the combination with a pivotal type-bar, of a pivotal type head or carrier, a locking device carried by the type-bar for securing the type head or carrier in its normal position, said locking device including a trip-arm, a stationary trip arranged permanently in the path of said trip-arm for moving the locking device into engagement with the type head or carrier, and a key-actuated movable trip yieldingly held out of and adapted to be adjusted into the path of the trip-arm to provide for disengaging the locking device from the type head or carrier, substantially as specified.

8. In a type-writing machine, the combination with a pivotal type-bar, of a pivotal type head or carrier, a locking device carried by the type-bar for engagement with the type head or carrier to secure it in its normal position and yieldingly held in either its operative or inoperative position, and stationary and movable trips for actuating said locking device, the former being permanently arranged in operative position and the latter being adjustable into and out of operative relation with the locking device, substantially as specified.

9. In a type-writing machine, the combination with a pivotal type-bar, of a pivotal type head or carrier, a pivotal trigger adapted to be arranged in engagement with the type head or carrier to secure it in its normal position and having a trip-arm, and fixed and movable trips for engagement with said trip-arm, the former being permanently in operative position and the latter being spring-actuated and adapted for movement into and out of engagement with the trip-arm, substantially as specified.

10. In a type-writing machine, the combination with a pivotal type-bar, of a pivotal type head or carrier, a pivotal trigger carried by the type-bar to maintain the type head or carrier in its normal position and having a trip-arm, a brake-spring arranged in contact with a friction-surface of the trigger to hold the latter in either its operative or inoperative position, and fixed and movable trips for coöperation with said trip-arm, the latter being adjustable into and out of operative position, substantially as specified.

11. In a type-writing machine, the combination with a pivotal type-bar, a type-carrier movably supported thereon, and means, as a trigger, for normally holding the type-carrier in one position, a trip for engagement with the trigger and mounted for movement into and out of operative relation with a trip-arm carried by the trigger, and means for actuating said trip, including a spider, a sliding spring-returned stud carrying the spider, and a case-key lever operatively connected with said stud, substantially as specified.

12. In a type-writing machine, the combination with the type-bar carrying the movable type-head, of a device also carried by the type-bar and having a locking engagement with the type-head, and a trip arranged to engage directly with said device.

In testimony that I claim the foregoing as my own I have hereto affixed my signature in the presence of two witnesses.

ROBERT JOSEPH FISHER.

Witnesses:
WILLIAM A. CUNNINGHAM,
CHARLES T. RIDDLE.